March 17, 1964 E. G. LILL 3,125,294
APPARATUS FOR HANDLING FIBER IN SUSPENSION
Filed Aug. 17, 1960 10 Sheets-Sheet 2

INVENTOR
ETCHISON G. LILL
BY *Hans G. Hoffmeister*
ATTORNEY

FIG_9

March 17, 1964 E. G. LILL 3,125,294
APPARATUS FOR HANDLING FIBER IN SUSPENSION
Filed Aug. 17, 1960 10 Sheets-Sheet 8

INVENTOR
ETCHISON G. LILL

BY *Hans G. Hoffmeister*
ATTORNEY

March 17, 1964 E. G. LILL 3,125,294
APPARATUS FOR HANDLING FIBER IN SUSPENSION
Filed Aug. 17, 1960 10 Sheets-Sheet 9

INVENTOR
ETCHISON G. LILL
BY Hans G. Hoffmeister
ATTORNEY

United States Patent Office 3,125,294
Patented Mar. 17, 1964

3,125,294
APPARATUS FOR HANDLING FIBER
IN SUSPENSION
Etchison G. Lill, East Lansing, Mich., assignor to FMC
Corporation, a corporation of Delaware
Filed Aug. 17, 1960, Ser. No. 50,174
2 Claims. (Cl. 239—77)

This invention appertains to the handling of fibers in suspension, and more particularly concerns a method of handling fibers in suspension and an apparatus for carrying out the method by the use of air to distribute a liquid mixture containing fiber and other material over large areas.

The walls of new cuts along highways are quite unfavorable as planting sites because the soil is quite hard and is frequently steeply sloped. It is imperative to quickly establish a root system at such a site because these slopes erode badly. Heretofore, two methods of planting these difficult areas have been used. The first method contemplates the use of hand labor and the steps of raking grass seed into the surface soil, covering the surface with straw, and then watering the straw. The first method is expensive because of labor and material costs and is unsatisfactory because the watering tends to wash away the seed. The second method consists of discharging a mixture of seed and water onto the ground through a large spray nozzle such as is found in fire fighting equipment. This second method reduces labor costs but the tendency for the seed to be washed away is also inherent in this second method. It is therefore an object of the present invention to provide an apparatus for efficiently distributing seed or other material over large areas of ground.

Another object of the present invention is to provide improved equipment for handling fiber in suspension.

Another object of the invention is to provide an improved method of handling fiber in suspension.

Another object of the invention is to provide improved equipment for rapidly establishing vegetable growth on unbroken ground.

Another object of the invention is to provide equipment for rapidly seeding highway slopes.

Another object of the invention is to apply a uniform fibrous mat containing soaked seeds to unbroken ground.

Another object of the invention is to provide an improved system of operating spraying equipment to achieve a substantially continuous application of a fibrous mat and entrained matter including seeds on the ground.

Another object of the present invention is to provide wheeled-vehicle-mounted discharge equipment for fibrous material in aqueous suspension, which equipment is adapted to be used with hand portable discharge devices.

Another object of the present invention is to provide an improved transportable carrier for fibrous material in aqueous suspension, the carrier maintaining the material in suspension during its transportation.

Another object of the present invention is to provide improved agitating equipment for fiber suspended in a liquid.

Another object of the present invention is to improve the flexibility of handling an aqueous suspension and clear water; the two liquids being contained in separate tanks on a single vehicle.

Another object of the present invention is to improve the fluid handling capabilities of a vehicle for transporting and continuously agitating a suspension of fiber in a liquid.

Another object of the present invention is to provide an improved vehicle-mounted blower.

Another object of the present invention is to provide a blower for handling mixtures of compressed air and fiber in liquid suspension.

Another object of the present invention is to provide equipment for intimately mixing a mass of moving gas and a quantity of liquid.

Another object of the present invention is to uniformly disperse wet fibers within a stream of moving gas.

Another object of the present invention is to uniformly disperse a discharging stream of water containing fiber in suspension into a moving mass of air.

Another object of the present invention is to efficiently spray paper stock having fiber lengths on the order of ⅝ of an inch in an air carrier.

Another object of the present invention is to provide a device for the intimate intermixing and spraying of a combination of compressed air and an aqueous suspension of vegetable fiber.

Another object of the present invention is to provide an efficient spraying apparatus for applying stock for making paper, the stock having a density on the order of 6 to 12 percent.

Another object of the present invention is to increase the speed at which many grades and weights of paper and paperboard can be made.

Another object is to reduce the quantity of water required in a paper-making operation.

Another object of the present invention is to provide improved apparatus for achieving completely random orientation of fibers in mats of vegetable fiber applied to a forming surface in a Fourdrinier machine.

Another object of the present invention is to provide apparatus for applying paper stock onto the forming surface of a paper-making machine in such a manner that the resultant paper has equal strength in its longitudinal and lateral directions.

These and other objects and advantages of the invention will be apparent from the description and accompanying drawings wherein.

The apparatus of the present invention for forming a slurry of fibrous material and spraying the slurry has many uses, but is particularly adapted to be used for efficiently covering large areas with a mulch for various purposes such as the preparation of seed beds by covering a large area with a mulch having grass seed therein, the prevention of weed growth by covering a large area with a mulch containing a herbicide, the treatment of soil by spreading thereover a mulch containing a fumigant, and the distribution of pulp on the forming wire of a paper-making machine.

Figure 1:
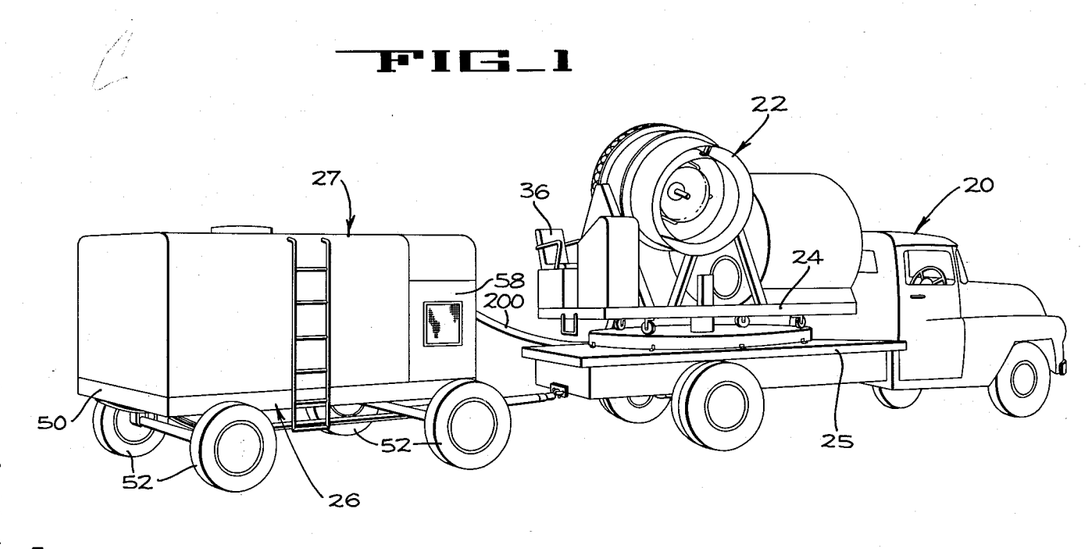
FIG. 1 is a side elevation of a truck-mounted embodiment of the material-distributing apparatus of the present invention.

The embodiment of the invention illustrated in FIG. 1 is particularly adapted to blow a wet fibrous mat containing seed onto long narrow expanses of ground such as the sloping surface of a cut through which a road or highway extends. This equipment comprises a truck 20, a blower assembly 22 mounted on a rotatable table 24 on the flat bed 25 of the truck, and a trailer 26 which is hitched to the rear of the truck 20. A supply tank 27, containing the material to be dispensed, is mounted on the trailer. The discharged material, hereinafter referred to as the stock, comprises a mixture of water, chemicals, seed and vegetable fiber, and this mixture is pumped from the tank to the blower unit 22 where the material is intimately mixed into a rapidly moving stream of air and carried by the air onto the adjacent ground. The fibers are in suspension in the water and are dispersed in a random fashion in the air stream so that the wet fibers are blown out horizontally and eventually fall out of the stream in substantially vertical direction to gently arrange themselves in a mat-like formation on the ground. Grass seed and soluble or suspendable materials such as fertilizers can be mixed into and discharged with the stock so that the wet mat contains soil nutrients as well as wet seed which will quickly germinate. A cover of vegetation can, with this equipment, be quickly established on irregular, eroded, or sharply sloped ground.

Figure 2:
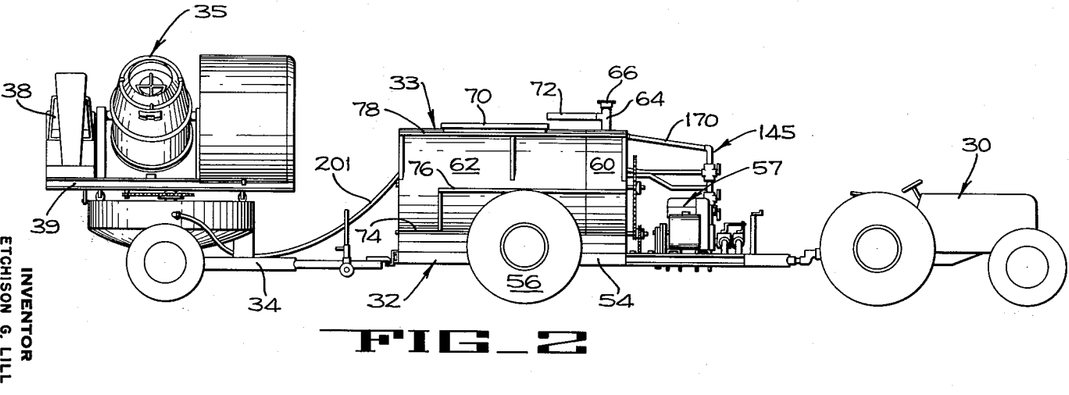
FIG. 2 is a side elevation of a second embodiment of the apparatus of the present invention, particularly featuring a tractor hitched to a material supply trailer and a trailer having a blower thereon.

A second embodiment of the invention, illustrated in FIG. 2, is particularly adapted to apply a fibrous covering over large, relatively flat areas. This equipment includes a tractor 30, a trailer 32 having a supply tank 33, and a second trailer 34 on which a blower 35 is mounted. The equipment shown in FIG. 2 is pulled over the area, which is to be treated, by the tractor 30. The slurry of fiber and water, or stock, is fed from the tank 33 to the blower 35 where the stock is intimately mixed with a rapidly moving mass of air and discharged onto the adjacent ground. The fall-out pattern of the stock applied to the ground is oblong having a major dimension of approximately 120 feet.

The equipment of FIG. 1 requires a driver for the truck and requires an operator who occupies a control seat 36 on the table 24 and controls the flow of stock from the tank 27 to the blower 22, and also controls the blower. In the equipment of FIG. 2, the driver of tractor 30 operates the mechanism which controls the flow of stock from the tank 33, while the controls of the blower 35 are operated by an operator who occupies a seat 38 that is mounted on a rotatable table 39 which carries the blower 35.

The most efficient operation of the tractor-pulled equipment shown in FIG. 2 can be had if a pair of tractors and a pair of stock tank-trailer units 32—33 are used in conjunction with a single blower-trailer unit 34—35. With this arrangement, one tractor and an attached stock tank-trailer unit 32—33 would travel to a water pick-up point, take on a full load of a slurry consisting of water, seed, and fiber, and rapidly return to the site where the remaining equipment is applying stock. As soon as the stock tank-trailer 32—33 that is then supplying the blower 34 runs dry, it is unhitched and the freshly-filled stock tank-trailer with its attached tractor 30 is hitched to the blower-trailer 34—35, and this combination of equipment is pulled through the field to continue the application of material at a substantially continuous rate. The empty stock tank-trailer is, of course, transported by its tractor 30 to the watering point where it receives a fresh charge of water, fiber material, seed, soil, nutrients, and other material.

In particularly rough terrain where there are a great number of crevices and mounds, it is sometimes difficult to achieve complete coverage when the stock is discharged from a single source. In these situations, it is desirable to use auxiliary stock applying apparatus, this apparatus being used in combination with either the blower apparatus 22 or 35 with equal facility. Such auxiliary apparatus includes a back pack blower 40 (FIG. 3), which is adapted to be carried on a person's back and receives stock from either the stock tank 33 or the tank 27 through a long hose 41.

Figure 3:
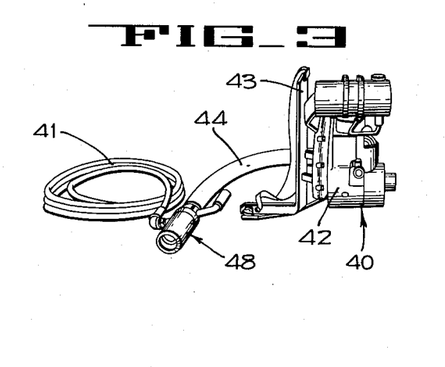
FIG. 3 is a diagrammatic illustration of a back-pack blower which may be used in combination with portions of the equipment of either FIG. 1 or FIG. 2.
Figure 4:
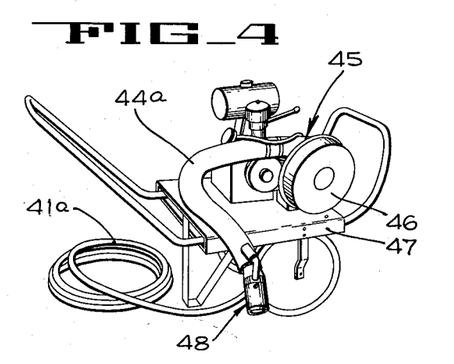
FIG. 4 is a diagrammatic illustration of a wheel-mounted blower also adapted for use with parts of the equipment of either FIG. 1 or FIG. 2.

Another piece of apparatus which can be advantageously used in these situations is a cart-mounted blower 45 (FIG. 4). The cart-mounted apparatus is likewise connected by means of a hose 41a to the stock tank 27 or 33, whichever one is being used. The back pack apparatus 40 and the cart-mounted apparatus 45 both include a hand-carried nozzle or gun 48 (FIGS. 3 and 4) which can be aimed by the operator into the crevices and behind mounds and into other places which tend to be inadequately covered by the discharge from a larger blower. With this auxiliary apparatus, a complete stock covering is obtained.

The back pack apparatus 40 comprises a gasoline-engine powered air compressor 42 which is mounted on a pack board 43. The compressor 42 supplies compressed air to the blower 48 through a large diameter air hose 44. The cart-mounted apparatus 45 comprises a gasoline-engine driven air compressor 46 which is mounted on a two-wheel push-cart 47. The compressor 46 supplies compressed air to the blower 48 through a large diameter air hose 44a. The hand-carried nozzles 48 for the back-pack apparatus 40 and the cart-mounted apparatus 45 will be described in more detail hereinafter.

The trailer-tank unit 26—27 (FIG. 1) and the trailer-tank unit 32—33 (FIG. 2) are generally similar except for the fact that the frame 50 of the trailer 26 mounts four wheels 52, while the frame 54 of trailer 32 (FIG. 2) is supported by two wheels 56. Also, a power unit 57 on trailer 32 is exposed while a similar mechanism on trailer 26 is enclosed by a housing 58. There is no difference in the internal construction of these two tanks 27 and 33; therefore, only the stock tank 33 (FIGS. 2, 5, and 6) will be described in detail.

The tank 33 comprises a forward cylindrical compartment 60 and a rear cylindrical compartment 62. The members defining the forward and rear compartments are rigidly connected to the frame 54. The forward compartment 60 holds several hundred gallons of fresh water, while the rear compartment 62 holds approximately 2,000 gallons of the slurry of water and fibrous material. The forward compartment is filled through an upstanding filler pipe 64 which includes a cap 66 screwed onto the upper end thereof. The rear compartment or stock-mixing compartment 62 is filled through a large opening 68 having a removable cover 70 thereover. The forward compartment 60 is filled with fresh water through the filler pipe 64 and, when the compartment 60 becomes full, the fresh water moves laterally through a lateral pipe 72 connected to pipe 64 and flows into the fill opening 68 in the stock-mixing compartment 62 if cover 70 is removed. Thus, the fresh water will flow into the compartment 60 until it is full and then all the water will flow out pipe 72 into the stock-mixing compartment 62. The opening 68 into the stock compartment 62 is made sufficiently large so that bales of peat moss, shredded newspaper and other masses of vegetable or quantities of synthetic or mineral fiber can be placed within the mixing compartment 62 in quantity and without any appreciable preliminary breaking-up operation. Sulfite paper stock having a fiber length on the order of ⅝ of an inch is quite satisfactory fibrous material. Flat platforms 74 (FIG. 2) at the rear of the wheels 56 on both sides of the trailer, flat platforms 76 above each of the wheels, and flat platforms 78 at the level of the top of the tank on the trailer, are provided to enable a workman to readily climb to the opening 68 and deposit bales of fibrous material therein. Other materials such as fertilizers, other soil conditioners, nutrients, germicides, insecticides, herbicides, water-miscible latex, asphalt emulsions, and any number of soluble chemicals, as well as grass seed and the seed of other plants, can likewise be placed in the mixing compartment 62 through the opening 68.

Asphalt emulsions and water-miscible latex are used in combination with the fiber to achieve an application which is impervious to moisture or other volatile material. Thus, with such a covering, moisture and/or volatile fumigants, herbicides or germicides, which have been previously applied to the soil, will not evaporate and water will not permeate the covering. Impervious coverings of this nature can be used to increase plant growth rate by raising the soil temperature by absorption of solar energy, particularly if the covering is black, preventing evaporation of the moisture from the soil, and preventing growth of weeds or other plants which use part of the available moisture. The fiber can be impregnated with herbicides to destroy all plant growth and yet cover the surface of the ground with a water pervious mat or cover.

The randomly intermingled fibers of the mat are automatically interlocked and the mat will readily remain intact for a period of time ranging from months to years depending on weather conditions, length of the individual fibers, mat thickness, and other factors. A small quantity of latex or asphalt can be used to bind the fiber of a mat together and yet leave the mat pervious allowing water to pass through the mat to the ground below. Seed interspersed in a mat containing a small amount of binder will readily germinate. These fibrous mats, whether they are applied with binder or not, are extremely useful in preventing erosion of the soil. The wet fibers of a mat fall closely around every irregularity on the surface receiving the application and eventually dry out in very close contact with the soil surface preventing its erosion. The pre-soaked seed used readily germinates to establish a vegetation cover on the most irregular surfaces.

Agitator blades 80 on a low speed agitator shaft 82, and shorter agitator blades 84 which project from both sides of a high-speed agitator shaft 86, are provided in the compartment 62 to break up the bales of fibrous material and thoroughly mix the other added material with the water so that it is dissolved or placed in aqueous suspension to form a slurry. This agitating operation also completely soaks any seed in the slurry with water so that it will germinate more quickly when applied to the ground. Pre-soaking the ground receiving the application is desirable in some instances.

Figure 5:
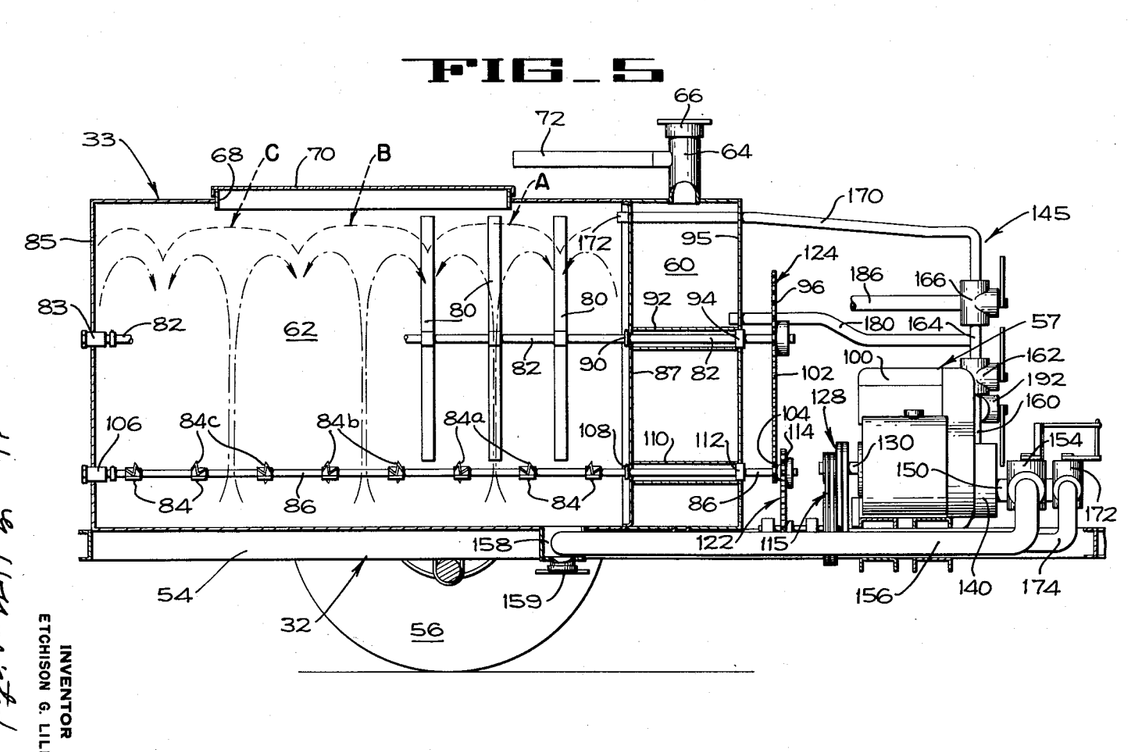
FIG. 5 is a vertical section, with parts broken away, of the material supply trailer seen in FIG. 2.

The low-speed agitator shaft 82 is mounted in a bearing 83 in an end wall 85 of the tank 33 and in a center wall 87 of the tank in a bearing 90. The shaft 82 extends through a tube 92 that projects across the fresh water compartment 60 and is mounted in a bearing 94 on a forward wall 95 of the tank. A large-diameter sprocket 96, fastened to the forward end of the shaft 82 (FIGS. 5 and 6) is driven by a gasoline-engine 100 through a drive chain 102 which in turn engages a sprocket 104 on the high-speed agitator shaft 86 (FIG. 5). The high-speed agitator shaft 86, which is mounted in a bearing 106 in the end wall 85 in a bearing 108 in wall 87, and in a bearing 112 in the forward wall 95, passes through a tube 110 within the compartment 60, extends forward to receive sprocket 114 (FIG. 5). The shafts 82 and 86 are driven by the engine 100 by means of a belt and pulley drive unit 115, a jack shaft 120, a sprocket and chain unit 122, and a sprocket and chain unit 124. A second belt and pulley unit 128 is connected between the drive shaft 130 of the engine and a fluid pump 140 of the centrifugal type.

The agitator shaft 82 is driven clockwise (FIG. 6) at a relatively slow speed, and the agitator shaft 86 is driven clockwise at a relatively high speed by the engine 100. The blades 80 are interdigitated with the blades 84 as seen in FIG. 5, and the combined blade action results in the rapid dispersion of the fibrous matter and rapidly produces the complete separation of the individual fibers within the liquid in the mixing compartment 62. The low-speed agitator blades 80 are long and can be flat so that they act as paddles that break apart compressed masses of fiber, and force floating material downward toward the bottom of the tank where it is subjected to the action of the high-speed agitator blades 84.

Figure 6:
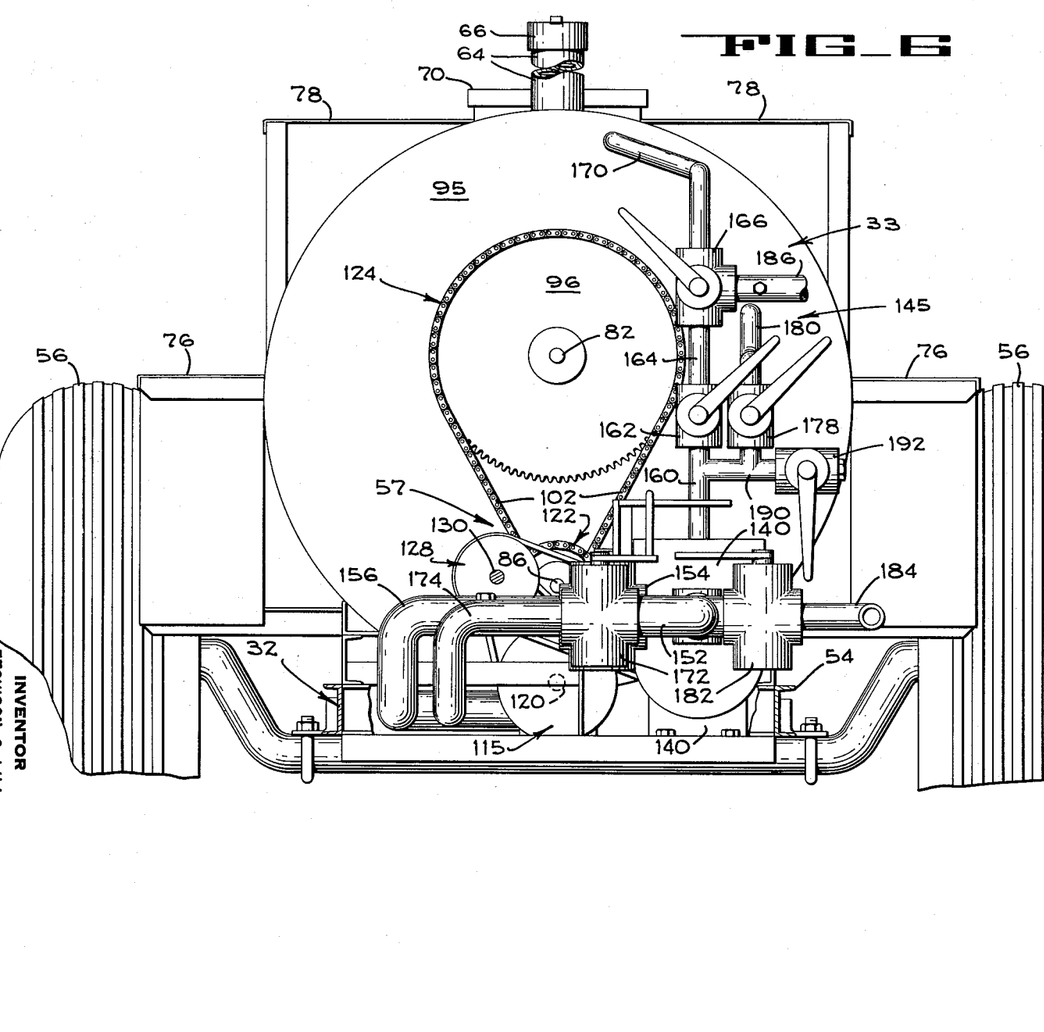
FIG. 6 is a front end elevation of the trailer shown in FIG. 5.

The three successive pairs 84a, 84b, and 84c of high-speed agitator blades on the shaft 86 are pitched so that the adjacent blades of each pair diverge upwardly relative to each other and each blade is disposed in a plane that intersects the plane of each adjacent blade. The high-speed agitator shaft 86 is driven in the clockwise direction as seen in FIG. 6 and thus, the illustrated adjacent blades 84 in these three successive pairs (FIG. 5) move upwardly from the position shown. The upward movement of each of the three pairs of divergent blades causes the liquid suspension above the blades to move upward. The liquid movement caused by the high-speed agitation can be described as a boiling action; that is, there are three locations where the suspension boils or rolls upward in a respective vertical plane. Pronounced mounds A, B and C (FIG. 5) of rapidly moving fluid, are formed by the rolling action above these three pairs of blades, respectively. There is a mound A of rolling suspension above the pair of blades 84a, a mound B of rapidly moving fluid above the pair of blades 84b, and a third mound C of rapidly moving fluid above the pair of blades 84c. The liquid suspension moves upward into the mounds A, B, or C and then rolls off or falls quickly to the sides causing standing depressions in the liquid level at each side of the three mounds. This so-called boiling action is quite rapid and results in the immediate breaking apart of fibrous masses of material such as bales of newsprint, peat moss, and other vegetable fiber and once the relatively solid masses of material are broken apart, the fibers separate and they are easily maintained in suspension in the water in the compartment 62 by the boiling action. A more rapid mixing is achieved if the low-speed agitator is used in combination with the high-speed agitator. The low-speed agitator, as was pointed out hereinabove, is effective to sweep down and break apart any masses of material which tend to float. If it is desired, the blades 80 on the shaft 82 can be angularly rotated with respect to each other when they are attached to the shaft 82 to smooth out the action of the blades moving through the fluid. Similarly, the blades 84 can be angularly rotated with respect to each other on the shaft 86. Such rotation of the blades 84 does not appreciably affect the amount of agitation or boiling action achieved within the compartment 62.

The density of the slurry in the stock chamber 62 is, of course, determined by the weight of fibrous and solid material placed therein as compared to the weight of water. This stock is used in many ways as previously discussed, and the density or concentration may vary from approximately 6% by weight of fibrous material to approximately 12% depending on the use.

During the transportation of a trailer-tank unit 26—27 or 32—33 from a water loading point to an area where the stock is to be discharged, it is desirable to maintain suction on the pump 140. Consequently, fresh water from the fresh water chamber 60 is continously circulated through the pump and returned directly to the fresh water tank; or alternatively, stock from the stock chamber 62 is continuously circulated through the pump and returned to the stock chamber. The usual practice is to recirculate stock because stock recirculation ensures a more complete mixing of the dense suspension. A valve and piping system 145 (FIGS. 5, 6, and 7) for handling these fluids will be most easily understood in connection with the diagrammatic illustration of this system in FIG. 7. The pump 140 (FIG. 7) has a suction line 150 which is connected to a lateral line 152 that leads through a two-way plug valve 154 to a line 156 that is connected to the bottom of a sump 158 on the lower side of the mixing compartment 62. The sump is provided with a drain 159. Stock flows through the sump 158, the line 156 and the open plug valve 154 into the suction side of the pump 140 and is discharged by the pump 140 into a line 160. The line 160 is connected to a two-way stock-discharge valve 162 and through a short line 164 to a three-way plug valve 166. The plug in the valve 166 has a T-shaped passage 168 therethrough which may be turned into the position shown in FIG. 7 to conduct the stock from the pump into a recirculate line 170. The line 170 passes through the upper end of the fresh water chamber 60 and has its discharge end 172 located to discharge into the stock chamber 62.

Figure 7:
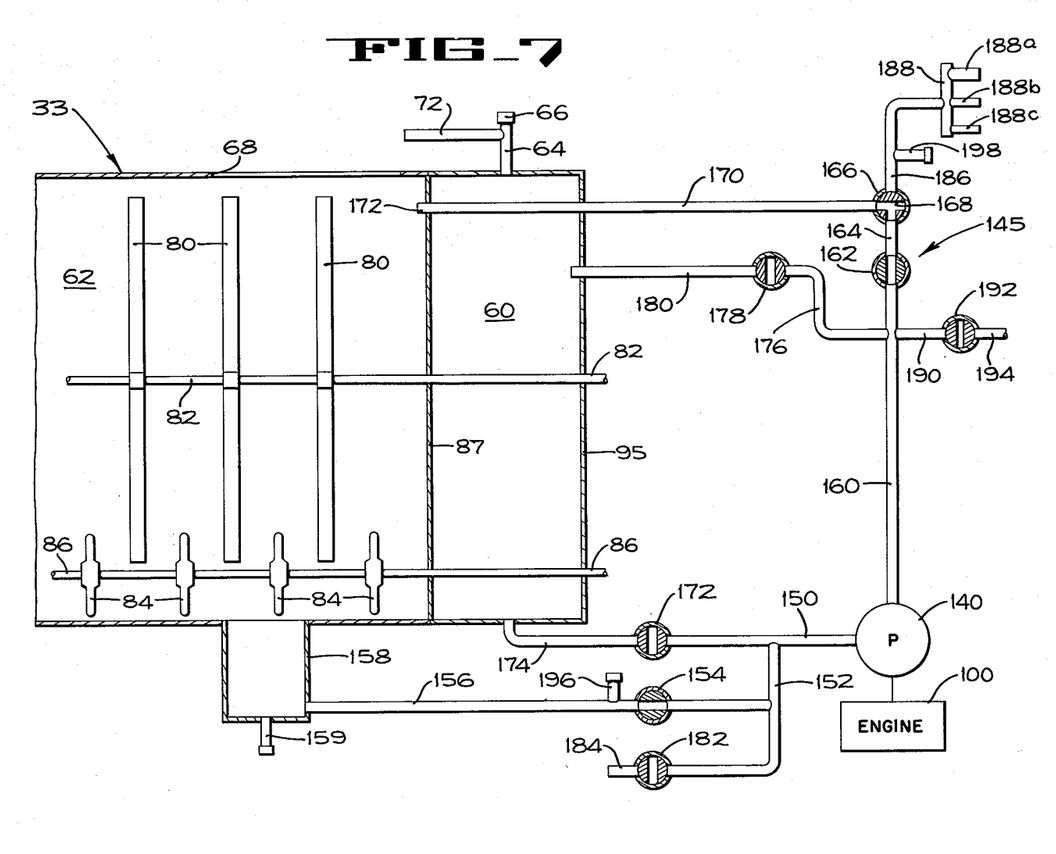
FIG. 7 is a diagrammatic illustration of the pumps and piping which are a part of the trailer of FIG. 5.

If the stock valve 154 is closed and a fresh water valve 172 in a line 174, leading from the bottom of the fresh water chamber 60 is opened, fresh water is drawn into the pump suction line 150 and discharged into the line 160. If fresh water is to be recirculated, the stock discharge valve 162 is closed and the fresh water is therefore diverted into a lateral line 176 which leads to a fresh water discharge valve 178, which in turn is connected to a fresh water recirculate line 180 that discharges into the fresh wtaer chamber 60. If it is desired, fresh water from a lake or a river, for example, can be pumped into the fresh water chamber 60 by closing the stock suction valve 154 and the fresh water suction valve 172 and opening a lake pick-up valve 182 so that a hose or other suitable apparatus connected to a pick-up line 184 can be used to draw water from the lake into the pump. The pump discharges this fresh water through the lines 160, 176, and 180, and into the fresh water chamber 60. It will be apparent that, when the chamber 60 is full, water will flow out the filler pipe 64, and if the filler pipe cap 66 is in place, the excess fresh water will discharge through the lateral line 72 into the opening 68 of the stock chamber 62.

When it is desired to pump stock to a blower such as the blower 35 (FIG. 2), the pump 140 draws stock from the tank through the plug valve 154 and discharges it through pipe 160, the open stock discharge valve 162, the passageway 168 in the plug of the three-way valve 166 to a discharge line 186 (FIGS. 5, 6, and 7) that leads to a discharge manifold 188 (FIG. 7). The manifold 188 includes at least one fitting 188a which is larger in flow capacity than the other fittings and which is adapted to be connected to a large diameter hose 200 (FIG. 1) or a similar hose 201 (FIG. 2). The stock hose 200 transports stock to the truck mounted blower 22 while the stock hose 201 supplies the trailer mounted blower 35 (FIG. 2).

The pump pressure line 160 has a lateral line 190 leading to a two-way plug valve 192 and thence to a discharge nipple 194. The lateral line 190 and the valve 192 can be used when pumping flushing water or stock back through the line 156 and thus force sediment up out of the sump 158. To accomplish back flushing, the pressure line 160 of the pump is connected to line 156 by connecting a hose between the discharge nipple 194 and a receiving nipple 196 which is in communication with the stock line 156. A second discharge fitting 198 is in communication with the line 186 and can be connected by a hose to the receiving nipple 196 so that fresh water or stock can be pumped into the line 156 and into the sump 158 for back flushing.

The stock receiving lines 41 and 41a of the back pack blower 40 and the cart-mounted blower apparatus 45 (FIGS. 3, 4, respectively) are each adapted to be connected to the discharge nipple 194 adjacent the valve 192, or these lines 41 and 41a can be connected to appropriate fittings 188b and 188c on the stock discharge manifold 188 (FIG. 7). The high density stock can be pumped to this back pack apparatus or the cart mounted apparatus through these fittings individually or concurrently.

Figure 8:
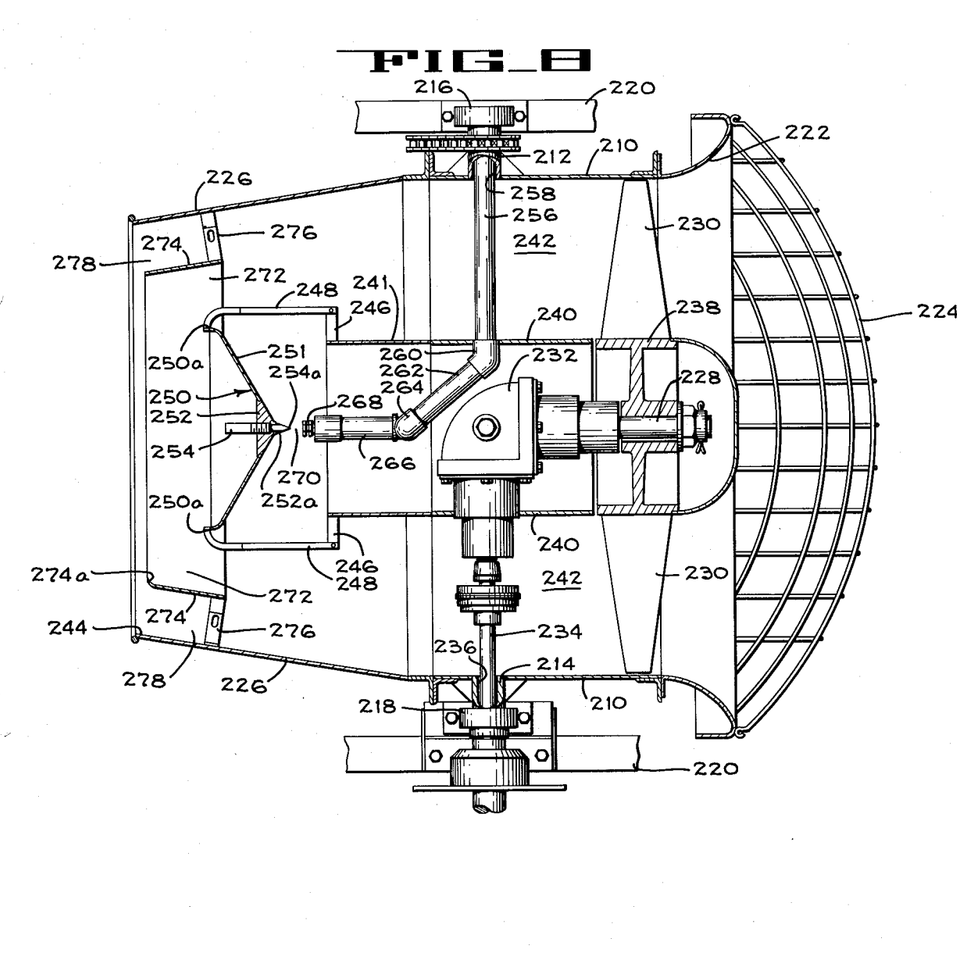
FIG. 8 is a horizontal sectional view on a slightly enlarged scale of the blower apparatus which is truck-mounted in FIG. 1 and trailer-mounted in FIG. 2.

Stock having a density of 6 to 12 percent is thick and pulpy and is difficult to spray. The individual fibers in the stock are usually about ⅝ of an inch in length and quickly clog small orifices and the valves in piston pumps. The minimum practical orifice diameter is ⅜ of an inch. The only practical pump is one of the centrifugal type and these have discharge pressures on the order of 100 p.s.i.

The blower 22 of the truck mounted blower apparatus of FIG. 1 and the blower 35 of the trailer mounted apparatus of FIG. 2 are identical and each controlled and driven in the manner completely disclosed in U.S. Patent No. 2,768,859, issued October 30, 1956 and assigned to the assignee of the present invention. The control and driving equipment for the blower apparatus of this patent application is as disclosed in the above-identified patent; therefore, only the interior construction of the blowers will be discussed hereinafter.

Each of the identical blowers 22 and 35 comprises a central cylindrical body portion 210 (FIG. 8) that is mounted in a structure 220 for pivoting movement in a vertical plane about an axis defined by coaxial horizontal tubular stub shafts 212 and 214, which are mounted in bearings 216 and 218, respectively. An air inlet nozzle section 222, having a screen 224 over the throat thereof, is attached to the rear part of the central cylindrical body section 210. A discharge nozzle section 226 is connected to the outlet side of the central body section 210. A propeller drive shaft 228, having a propeller 230 mounted thereon, rotates within the central body section 210 and is driven through a pair of bevel gears in a gear box 232 from a shaft 234 that extends through a central bore 236 in the stub shaft 214. The shaft 234 is connected to be driven by an engine and other mechanisms disclosed in the above-identified U.S. patent.

Coaxial with the propeller drive shaft 228 and the hub 238 of the propeller is a composite cylinder 240—241 which is suitably supported coaxially within the cylindrical member 210. The cylinder 240 surrounds the bevel gear box 232 and defines, between it and the cylindrical member 210, an annular space 242 which receives the air being driven toward an opening 244 at the discharge end of the blower by the propeller 230. Short lateral arms 246, which project outwardly from the rigid cylinder 240—241 have longitudinally extending support arms 248 connected thereto, the arms 248 being curved at their distal ends and fastened to the outer peripheral edge of a material deflection cone 250.

The deflection cone 250 includes a sheet metal frusto-conical portion 251 and a central conical core 252 which has a surface that is a smooth continuation of the surface of the portion 251. The core 252 is axially tapped to receive a threaded plug 254 that has a curved pointed end which forms a smooth concave surface which extends from the point **254*a* of the plug along its shank to the edge 252*a* of the central core 252**.

Vegetable fiber in aqueous suspension is conducted into the blower to a point adjacent the deflection cone 250 by means of a pipe 256 which extends through a central bore 258 in the tubular stub shaft 212. The pipe 256 extends across the annular space 242, enters the central cylinder 240, connects to an elbow 260, a nipple 262, an elbow 264, a nipple 266, and a metering discharge nozzle 268 (FIG. 8). The nipple 266 and discharge nozzle 268 are coaxial with the longitudinal axis of the blower 35 and are coaxial with the pointed plug 254 and the deflecting cone 250. Stock under pressure shoots across the space 270 between the discharge nozzle 268 and the point 254a of the plug and moves radially in all directions as it spreads out on the surface of the deflecting cone. It will be apparent that the distance between the discharge nozzle and the point of the cone may be varied by rotating the plug 254 in the member 252.

The stock spreads radially as it moves across the surface of the deflection cone 250, leaves the edge 250a of the cone as a film of approximately .010 inch thickness, and shoots across an annular space 272 to strike an annular shroud 274 which is centered in the discharge opening 244. The shroud 274 is mounted in the opening on a plurality of adjustable brackets 276. The shroud 274 is frusto-conical in configuration and its outer surface is parallel to the inner surface of the adjacent discharge nozzle 226 to define therebetween an annular space 278. The smaller diameter end of the shroud 274, can if desired, be provided with an inturned, lip portion 274a, which is curved inwardly to the extent necessary to ensure that a predetermined portion of the stock leaving the edge 250a of the deflecting cone strikes some portion of the inside surface of the shroud 274. The optimum configuration of the lip 274a will be a function of several variables including the velocity of the air traveling through the annular chamber 242, the velocity of the stock discharge, the quantity of the stock discharge, and the density of the stock. These several factors must be taken into consideration when designing the shroud 274 and its lip 274a.

The shroud 274 is designed to intercept and to break apart any accumulations of fiber which move across the space 272. These accumulations or small masses of intermingled fibers strike the shroud 274 and burst apart by the impact, thus causing the intermingled fibers to be more completely separated before they leave the discharge end 244 of the blower. High velocity air moves through the annular chamber 242 of the blower, and along the converging inner surfaces of the discharge section 226. It will be apparent that the direction of air flow is substantially 90° to the direction of stock movement along the surface of the cone 250. Thus, stock moving across space 272 and rebounding from the shroud 274 is picked up by the moving air column and blown leftward out of the blower. Movement of air through the sheet of stock causes the air to tear through the stock and pull apart fiber masses which may be tangled together. Air traveling in the outer annular air space 278, which is on the outside of the shroud 274, encloses and converges around the discharging stream of air and stock. It will be apparent that if the frusto-conical shroud 274 is made having the inturned lip 274*a*, this lip will cause turbulence in the air stream and this turbulence tends to continually move the web fibers and other material toward the center of the air stream, and at the same time, the turbulence causes a more complete dispersion of the fibrous material within the air stream.

A modified form 300 (FIG. 9) of the blowers 22 and 35 includes an annular air passageway 302 which conducts air from the propeller (not shown) toward the discharge end 304 of the blower 300. The annular space 302 lies between a frusto-conical discharge nozzle section 306 and a central member 308 which is parabolic in cross-sectional configuration and is coaxial with the discharge nozzle section 306.

Fiber in suspension is received through an input line 310 which leads into an elbow 312 which in turn is connected to a swivel joint 314 that is fastened into the discharge nozzle section 306. A line 316 leads across the space 302 from the swivel joint and connects into an elbow 320 which in turn is connected to a short pipe 322, that is connected to a discharge fitting 324. Stock discharged through the discharge fitting 324 moves across a space 326 and spreads apart on the point 327 of a coaxial plug 328 and the surface of a coaxial deflecting cone 329. The deflector cone is supported in position downstream from the discharge fitting 324 by a supporting frame which comprises a plurality of arms 330 which are fastened to the central member 308, are curved in the regions 330*a* and terminate in radial portions 330*b*. The radial portions 330*b* merge at the center axis of the apparatus to form a hub 333 which is longitudinally drilled at 334 to receive a threaded member 336. The cone 329 includes a central boss 329*a* that is threaded to engage the threaded member 336. The cone 329 can be advanced or retracted on the threaded member 336 with respect to the discharge fitting 324 and thus the adjustment of the distance between the point 327 and the discharge orifice in the fitting 324 can be effected. The curved portion 330*a* of the supporting arms 330 has a knife edge 330*c* which faces the onrushing stream of fluid and provides a minimum amount of resistance to its passage.

The stock is split by the pointed center 327 of the deflecting cone 329 and the stock spreads or "fans out" on the surface of the deflector cone 329 and it becomes progressively thinner as it moves toward the edge 329*b* of the cone. In this manner, a sheet of stock is formed which moves from the edge 329*b* of the cone radially outward toward an annular shroud 340 (FIG. 9). The shroud 340 is frusto-conical in shape and is centrally mounted within the discharge end 304 of the blower on suitable mounting brackets 342. The stock strikes the shroud and rebounds therefrom to be continuously picked up by and discharged with the rapidly moving column of air arriving through the annular passage 302. Some intermingled masses of fiber leaving the edges 329*b* and moving across the space 344 will strike the shroud 340 near its discharge end 340*a* and be completely broken apart by the impact. Other relatively tight masses of fibers may be blown downstream beyond the edge 340*a* of the shroud 340, and an auxiliary shroud 346 is coaxially attached by several short brackets 348 to the edge region 340*a* of the primary shroud 340 to receive and break apart the fiber. The shroud 346 is frusto-conical in configuration and has its rear edge 346*a* substantially aligned in the transverse plane which lies along the plane of the discharge end 306*a* of the discharge nozzle 306 and along the plane of the discharge end 340*a* of the shroud 340. The walls of the auxiliary shroud 346 converge more sharply toward the center of the blower than do the walls of shroud 340. A portion of the expanding sheet of stock will strike the auxiliary shroud inner surface and this impacct causes the stock material to burst apart to be more completely dispersed into the rapidly discharging column of air. The stock from the auxiliary shroud is picked up primarily by the air portion of the air column which enters the annular space 350 between the outer surface of the shroud 340 and the inner surfacce of the shroud 346. This air is redirected by the inwardly directed walls of the auxiliary shroud toward the center of the discharging column. Air travelling along the outer wall of the blower defined by the inner surface 306*b* of the discharge nozzle 306 moves through an annular passageway 352 lying between the inner surface and the outer surface of the auxiliary shroud 346, and surrounds and converges around the discharging mixture of stock and air.

Little, if any, turbulence is caused by the primary shroud 340 because its side walls are substantially parallel to the side walls of the discharge nozzle 306. However, the auxiliary shroud 346 has more sharply converging walls which causes turbulence in an annular or toroidal pattern just inside the periphery of the discharging cylindrical column of air and stock. This turbulence is a pronounced rolling action, the air rolling inwardly on itself toward the center of the discharging column.. This turbulence just inside the surface of the stream of moving fluid causes particles which tend to drop out of the discharging fluid stream to be picked up and returned toward the stream center. This action produces a discharging fluid column which maintains its integrity for long distances; that is, the discharging column does not tend to fall apart until it has moved a considerable distance from the blower. The dispersed water particles, wet fibers, seed and other solid material are continuously being picked up by the turbulent outer periphery and returned toward the center of the column so that these heavy particles do not drop out by gravity prematurely in the application of the wet material to a surface.

Figure 9:
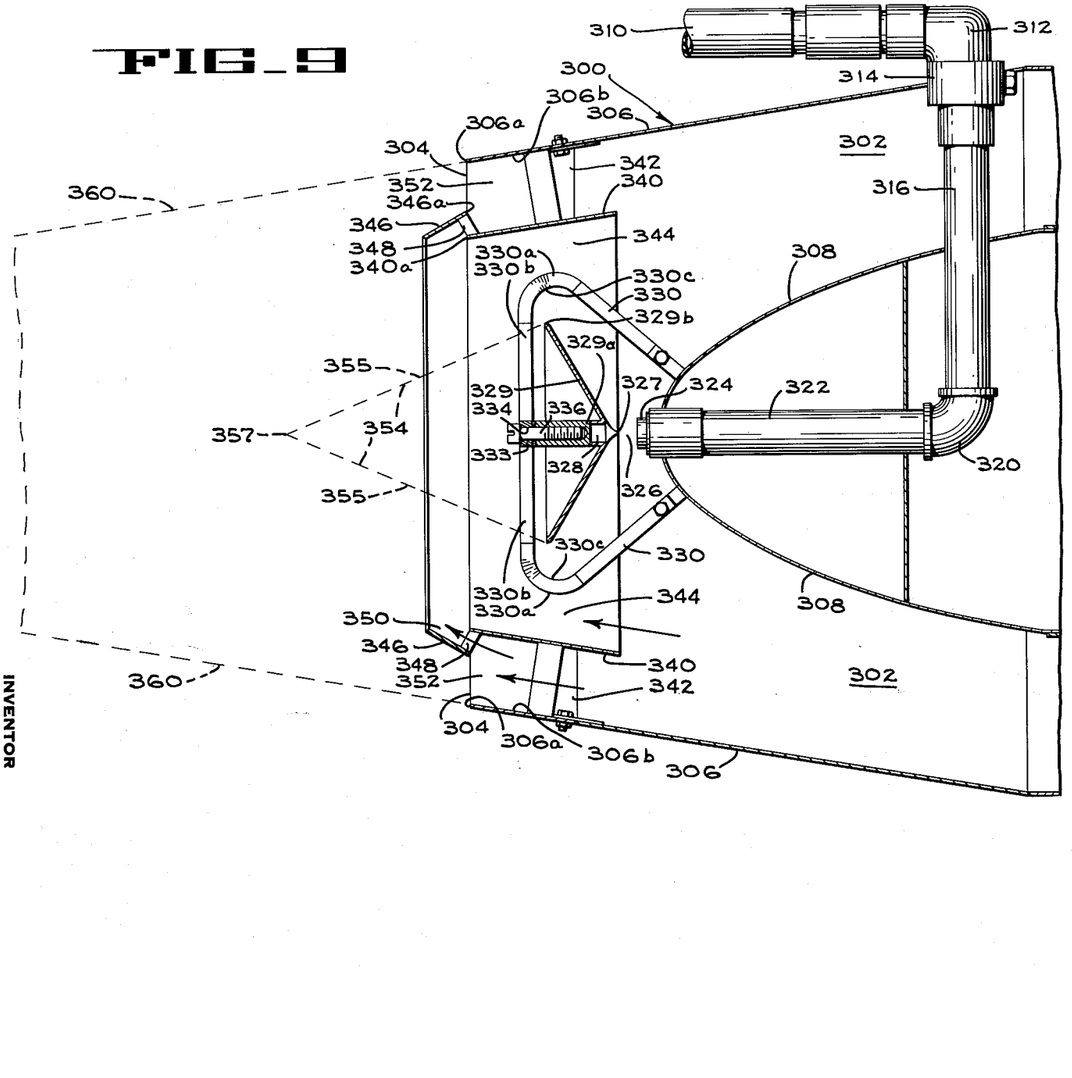
FIG. 9 is an enlarged horizontal sectional view of a modified form of the blower apparatus illustrated in FIG. 8.

It will be seen that a low pressure air space 354 is formed downstream of the dispersing cone 329. This low pressure air space 354 (FIG. 9) is conical in shape as indicated by dotted lines 355 which terminate at an apex point 357. The discharging column indicated by dotted lines 360, converges as it leaves the discharge section 306 and eventually becomes substantially cylindrical. As the forces of the propelling air behind the solid particles dissipates, the solid material gently falls out of the column and drops substantially straight down onto the receiving surface.

A particular feature of the blowers 22 and 35 is the manner in which the discharging stock interacts with the discharging high velocity air column. In these two blowers the stock moves radially outward in a thin sheet, and the high velocity air moves transversely through this sheet, that is, at substantially right angles to it, and by a "tearing action" breaks apart the intermingled masses of fiber, breaks the water up into small droplets and carries this solid material out the discharge end of the blower.

Figure 10:
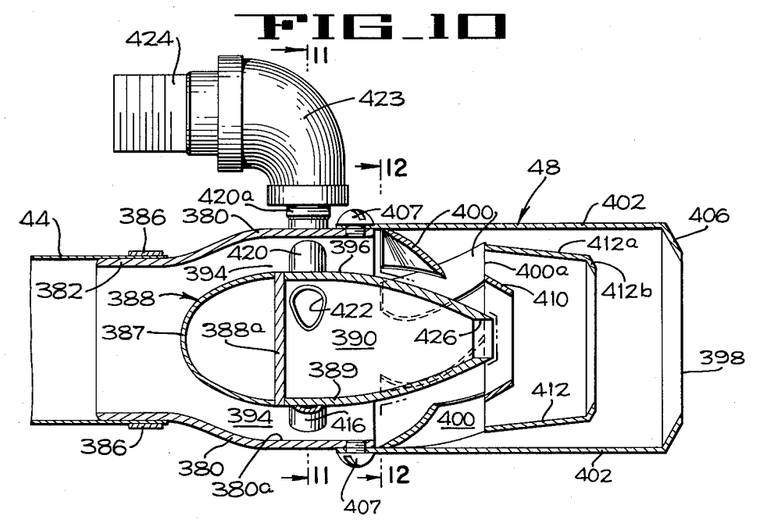
FIG. 10 is an axial sectional view of a portable blower.
Figure 11:
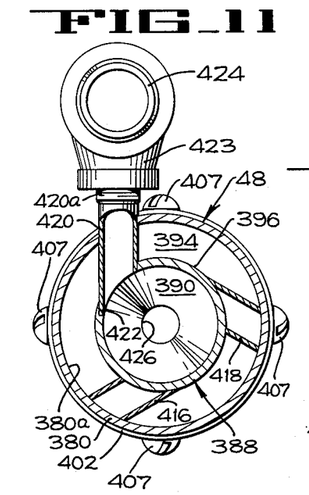
FIG. 11 is a transverse section taken along line 11—11 of FIG. 10.
Figure 12:
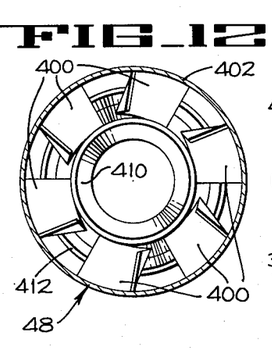
FIG. 12 is a transverse section taken along line 12—12 of FIG. 10.
Figure 13:
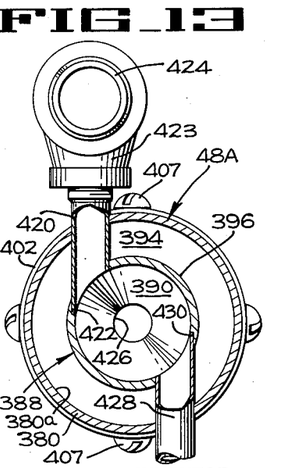
FIG. 13 is a transverse section of a modified form of the apparatus of FIG. 10, the section being taken along section line 11—11 of FIG. 10.
Figure 14:
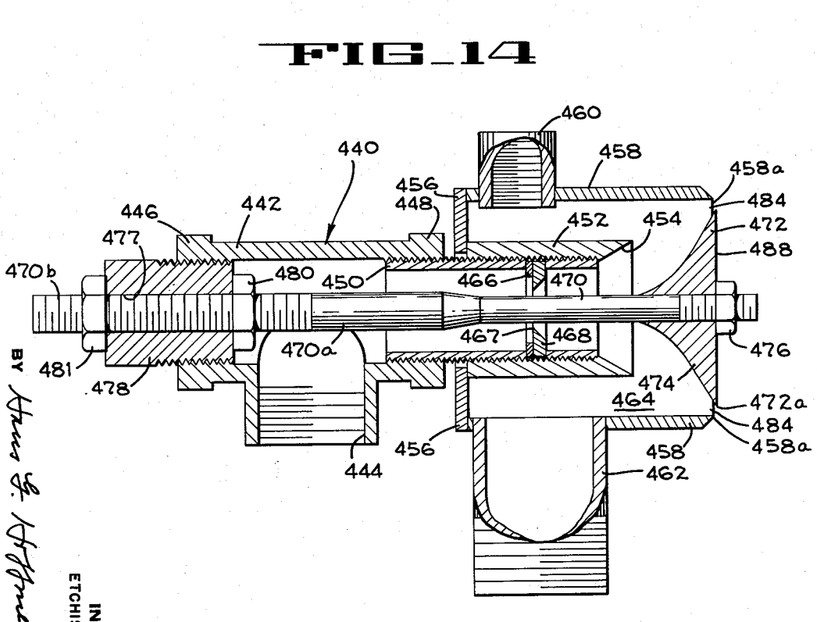
FIG. 14 is an axial section of a modified form of a stock blower, this form also being adapted to be hand carried.
Figure 15:
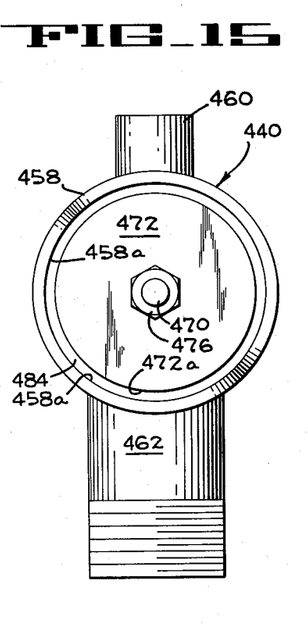
FIG. 15 is an elevation of the discharge end of the blower shown in FIG. 14.
Figure 16:
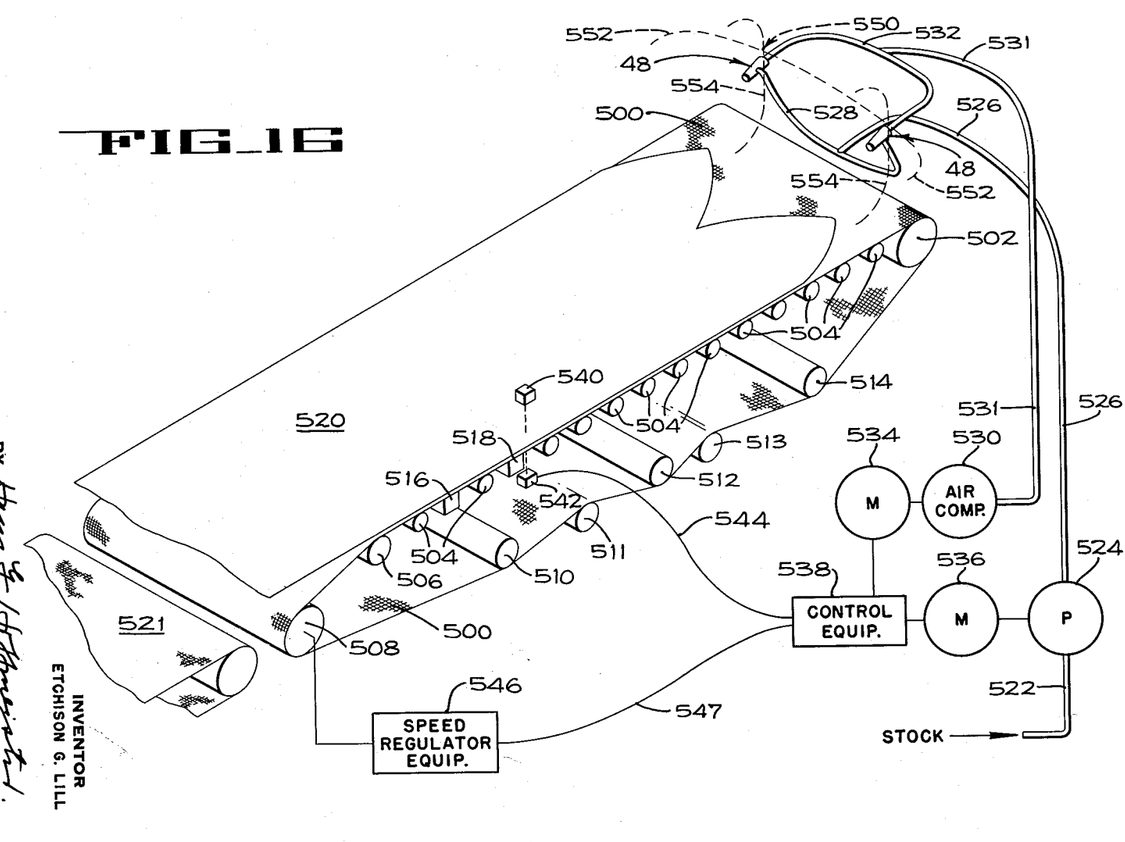
FIG. 16 is a diagrammatic illustration of a paper-making machine of the Fourdrinier type using the fiber handling apparatus of the present invention.

The blower nozzle 48 that is used with the back-pack apparatus 40 (FIG. 3) and the cart mounted apparatus 45 (FIG. 4) comprises a body section 380 (FIGS. 10, 11, and 12) having a necked-down portion 382 that is connected by a clamping band 386 to the compressed air supply line 44 or 44a. Compressed air flows over the rounded, generally spherical end portion 387 of a hollow central deflector member 388 and moves toward the discharge end of the nozzle. A partition 388a lies between the end portion 387 and extends across the interior of a converging portion 389 of the central deflector member 388 and a swirl chamber 390 is formed in the member adjacent the partition. The air moves along the annular space 394 surrounding the outer surface 396 of the central member 388 and moves toward the discharge end 398 of the nozzle 48 where it is discharged over a series of six vanes 400 (FIG. 12) which are welded or otherwise attached to the inner surface of a cylindrical discharge housing 402 (FIGS. 10 and 12). The air is rotated in the clockwise direction as it passes the vanes 400. The discharge housing 402, which is connected to the body section 380 of the nozzle by screws 407, includes an annular flange member 406 which converges sharply toward the central axis of the nozzle. Attached to the right end 400a (as seen in FIG. 10) of each of the vanes 400 is an inner frusto-conical deflector 410 and an outer frusto-conical deflector 412. The inner frusto-conical deflector 410 is coaxial with the axis of the hand blower 48 and has converging side walls. The outer deflector 412 is also frusto-conical but has less sharply sloped side walls 412a and includes an inwardly sloped annular end portion 412b. The housing 402 containing the six vanes 400 and the deflectors 410 and 412 comprise a single part which is removed and replaced on the body 380 by loosening the screws 407.

The central deflector member 388 is mounted at the center of the nozzle on a pair of tubes 416 and 418 (FIG. 11) which are welded between the outer surface 396 of the member and the inner surface 380a of the body of the hand gun. A third tube 420, positioned 120° away from each of the other two tubes 416 and 418, provides a third support for the central member 388. The tube 420 communicates through a port 422 with the swirl chamber 390 for the purpose of conducting stock into the swirl chamber. The tube 420 extends out through the side-wall of the body 380 and is threaded on its distal end 420a to receive a reducing elbow 423. The elbow 423 is connected to a nipple 424 (FIG. 10) that is connected to a hose, such as the hose 41 (FIG. 3) or the hose 41a (FIG. 4) which hoses are in turn connected to the stock manifold of the stock tank-trailer.

Stock arriving through the tube 420 moves tangentially into the swirl chamber 390 and moves in a counter-clockwise helical path toward a discharge orifice 426 (FIG. 10) of the swirl chamber. The stock moves through the orifice 426 and fans outward in a continuous conical pattern toward the deflector 410 and the deflector 412. The stock is swirling at a high angular velocity when it leaves the discharge orifice 426 and, as it radiates outward, portions of the stock strike the deflectors 410 and 412 to burst apart any entangled masses of fiber, and then moves into the onrushing annular column of compressed air that is deflected in the clockwise direction by curved vanes 400. The clockwise swirling air violently interacts with the counterclockwise swirling stock and the action results in a thorough breaking up of stock particles. The violence of the interaction permits stock concentrations on the order of 10% to 12% by weight to be handled in large volumes, i.e., volumes larger than 10 gallons per minute.

A modified form 48A of the hand gun 48 is disclosed in FIG. 13. This modified form is identical to the hand gun 48 described hereinabove except that the supporting tubes 416 and 418 (FIG. 11) are replaced by a stock inlet tube 428. The tube 428 is similar to the tube 420 in that it is connected in communication with the swirl chamber 390 through a port 430 that is 180° across the swirl chamber 390 from the port 422 which receives the previously described tube 420. The pair of tubes 420 and 428 simultaneously carry equal amounts of stock to the interior of the swirl chamber 390 where it moves through the discharge orifice 426 to be discharged into the moving air column. The capacity of the gun 48A is greater than the capacity of gun 48.

A modified blower or hand gun apparatus 440 is disclosed in FIGS. 14 and 15. The gun 440 comprises a T-pipe fitting 442 having an inlet 444 and a cross passage having a threaded end 446 and a threaded outlet 448. The outlet 448 receives a threaded nipple 450 which also engages a cylindrical member 452 having a beveled end 454. The cylinder 452 is welded to a concentric disc 456 which is welded to a larger diameter concentric cylinder 458. An internally threaded pipe 460 communicates with the space within the cylinder 458 and is adapted to receive a pressure gauge (not shown). A threaded fitting 462 is in communication with the interior of the cylinder 458 at the lower portion thereof and is adapted to conduct compressed air into the annular chamber 464 between the cylinder 452 and the cylinder 458. Stock enters the T-fitting 442 through the opening 444 and flows through the outlet 448 toward the right as seen in FIG. 14. The stock flows through the nipple 450, through a flat annular washer 466, through a metering orifice 467 in a disc 468, and out the beveled opening 454 of the cylinder 452. Centrally disposed in the metering orifice disc 468 is a rod 470 that has mounted on its distal end a flared cap member 472. The member 472 is essentially conical in shape but its sides 474 are noticeably concave as seen in FIG. 14. The cap member 472 is threaded onto the distal end of the rod 470 and a nut 476 locks the cap portion 472 on the end of the rod 470. The rod 470 is larger in diameter near the proximal end as seen at 470A, and this end is received in a central bore 477 in a threaded plug 478 that is threaded into the end 446 of the T-member 442. The large diameter portion 470A of the rod 470 is threaded at 470b and nuts 480 and 481 on the respective sides of the threaded plug 478 retain the rod at a particular location with respect to the plug 478. It will be apparent that the turning of plug 478 or the adjustment of the nuts 481 and 480 produces axial movement of the rod 470 and attached cap member 472 on the distal end thereof. This adjustment permits the repositioning of the cap member with respect to the end 458A of the large diameter cylinder 458.

Stock moving through the orifice 467 spreads radially over the surface 474 of the deflecting cap member 472 and moves toward the annular edge 472a of the cap member. Air entering the member 462 moves in the space 464 and carries the stock out the annular discharge opening 484 defined between the edge 458a of the outer cylindrical member 458 and the edge 472a of the cap member 472. The compressed air tears through the stock at the edge 472a and the interaction is such that the stock is completely dispersed into the column of moving air. A low pressure region occurs immediately adjacent the downstream face 488 of the cap member 472 and lies at the center of the column of moving fluid. This region tends to draw the fluid column together maintaining the integrity of the column for long distances and it also tends to more completely disperse the wet fibers and other solid materials into the moving air stream.

The violent interaction between the stock and high velocity air achieved by the equipment of this invention results in apparatus which is capable of handling much higher percentages of solid material in a given quantity of air than has been possible heretofore. The hand guns or blowers 48 and 48A not only merely move the high velocity air transversely through a sheet of stock, but also due to the opposite rotational movements of the air and the stock, moves the stock and air "head-on" into each other. This head-on interaction is considerably more violent than a transverse interaction alone and therefore with the addition of the head-on interaction a more complete dispersion of the fibrous material and water in the discharging air is accomplished. This provision of more complete dispersion permits the use of the apparatus to handle much larger volumes of stock in a given quantity of air. The volumes of stock which can be applied or handled are on the order of 20 times larger than volumes which heretofore have been achieved with known equipment.

In FIG. 16, an embodiment of the present material distributing apparatus, that is particularly adapted for use in paper making machinery, is illustrated.

The paper stock used in the manufacture of paper has a density on the order of .5 to 1.5% fiber by weight. This low density stock is screened, transported through a mix box and into a head box where it flows by gravity out onto the receiving surface. The receiving surface in a Fourdrinier type paper making machine is a moving wire screen. The wire screen receives and transports the stock and concurrently drains it to a concentration or density of approximately 8% to 12%.

In FIGURE 16 there is diagrammatically illustrated a wire screen 500 otherwise called the making surface or forming surface of a Fourdrinier type machine. This screen is trained around a breast roll 502, over a plurality of table rolls 504, an end roll 506, a couch roll 508, and over a series of tightening and return rolls 510, 511, 512, 513, and 514. The stock which would normally arrive from a flow box (not shown) located just above the breast roll 502, moves out onto and is transported by the wire over the table rolls 504 to the end roll 506 and thereafter to the couch roll 508. The open-mesh wire screen permits the continuous draining of the water through the openings in the wire screen and this draining permits the suspended fibers to settle out onto the wire screen. Suction boxes 516 and 518, FIG. 16, are conventionally used to assist in the removal of water from the stock on the moving forming surface. The drained stock forms a mat of wet fiber 520 which, at the couch roll 508, has a density on the order of the 10 to 12%. This wet paper mat 520 is picked up at the couch roll by a felt 521 which transports it into press rolls where more of the water is removed. From the press rolls the mat is transported to drying rolls and calender rolls which finish the paper and bring the density up to about 85%, depending on the type of paper.

The Fourdrinier wire 500 is in most machines from 10 to 12 feet wide and moves at a linear velocity of from 800 to 2000 feet per minute. The wire is from 70 to 80 mesh and quite flexible. It should be apparent that a rapidly moving wire can be easily damaged and any hole or imperfection would cause an imperfect paper mat and result in a defective product. A damaged or imperfect wire cannot usually be repaired satisfactorily and, of course, wire replacement is both time consuming and expensive.

If the stock being applied to the wire is relatively dense, the mesh of the wire surface can be much coarser than 70 to 80 mesh and an extensive length of forming wire surface is no longer necessary because a relatively dense stock can be drained in a much shorter time. With this in mind, it will be seen that the hand guns 48, 48A and 440 which are adapted to spray vegetable fiber in a water suspension having a density of from 6 to 12 percent, can be advantageously used in paper making machinery in place of the conventional flow box. It will also be apparent that stock of 10–12% density can be discharged directly onto the felt 521 eliminating the need for the expensive wire and the flow box. One or several of the disclosed hand gun devices can be positioned to discharge the stock toward the upper surface of the felt or the moving wire in a pattern which causes the receiving surface to be evenly coated with the dense stock.

The two hand guns 48 (FIG. 16) are located above the breast roll 502 and are supplied with stock through a line 522 which leads to a pump 524 having a discharge line 526 that leads to a manifold 528 that is connected to each of the guns 48. Compressed air is supplied to the guns 48 from an air compressor 530 which discharges into a line 531 that is connected into an air manifold 532 which is connected to each of the blower guns 48. Control equipment is used to control the motor 534 for the air compressor and the motor 536 which drives the pump 524. The control equipment can be adjusted by an operator to determine the thickness and the speed at which a mat is formed on the forming surface. In some situations the control equipment can be automatically adjusted by a continuous input of information from a radiation emitting device 540 which operates in conjunction with a transducer 542 located below the mat. The transducer 542 is connected by a control line 544 to the control equipment 538.

The couch roll 508 is powered to advance the forming wire at a particular linear speed and the speed of rotation of the couch roll is determined by speed regulating equipment 546 (FIG. 16). The speed regulating equipment can be automatically maintained in adjustment by information supplied through a line 547 leading from the control equipment 538.

The several blower devices 48 are mounted in a supporting framework 550 which enables the placement of each of the devices 48 at any point along a respective horizontal axis 552 or a respective vertical axis 554. With these adjustments each of the several blower devices 48 can be placed at a particular point with respect to the forming wire 500 so that the discharge pattern is such that the wet fibers are placed on the wire in the desired manner. The blower devices 48 can discharge along a line that is parallel to the upper surface of the wire 500 or the devices can be directed downwardly at an angle of 20°, 30°, 40°, or even 90° to the surface of the wire 500. The direction of the discharge from the devices 48 can also be angularly adjusted in a horizontal plane so that there is a cross-fire between the several discharging columns of stock and air.

In ordinary Fourdrinier paper making machines the low density stock moves out onto the wire at a linear speed which is approximately equal to the linear speed of the moving wire. With the machinery operating in this manner, the stock does not move appreciably relative to the wire and therefore the fiber simply settles into a mat as the water drains out of it. However, if there is a slight difference in linear speed, that is an acceleration or deceleration of the stock with respect to the wire, there is a definite tendency for the fibers to become oriented longitudinally, i.e., in the direction of wire movement. This longitudinal orientation of the fibers causes the paper to have great longitudinal strength but, because there are few cross fibers, the paper has little lateral strength. For some purposes this high longitudinal strength and rather weak lateral strength in the paper is desirable; however, for others it is undesirable. In some papers it is desirable to have no appreciable difference between lateral and longitudinal strengths, and, in order to achieve this, it is necessary that the fibers on the forming surface maintain completely random orientation.

The fiber in the stock leaving a blower 48 is completely randomly oriented and, since the linear velocity of this air-borne stock is readily controlled, the stock can be controlled to settle out onto the forming surface with a velocity equal to the velocity of the forming surface. When the equipment is operated in this manner the stock fibers retain their completely random orientation.

The velocity of the air-borne discharging stock is quite high compared to the flow velocity from the ordinary Fourdrinier machine head box and this great increase in the velocity of stock enables the operation of paper making machinery at an extremely high linear rate as compared to the present practice. Therefore, with the disclosed paper-making equipment, forming speeds of 4000 to 8000 feet per minute are feasible.

While several embodiments of the present invention have been shown and described it will be understood that the apparatus is capable of modification and variation without departing from the principles of the invention and that the scope of the invention should be limited only by the scope and proper interpretation of the claims appended hereto.

The invention having been described, that which is claimed and desired to be protected by Letters Patent is:

1. An apparatus for forming a fibrous mat on a predetermined surface comprising a housing having an outer wall circumscribing a discharge opening; means communicating with said housing for forcing air at high velocity toward said discharge opening; means mounted within said housing for discharging a slurry of liquid and fibers toward and substantially centrally of said opening, some of said fibers entangling in small masses in said slurry; an annular frustro-conical deflector having inside and outside surfaces; means mounting said deflector substantially concentric with said housing, adjacent to said discharge opening in the path of said air, and so that said deflector converges in the direction of movement of the air with its inside surface directed inwardly; and means mounted in said housing concentric with said deflector for guiding said slurry in a generally conical pattern diverging outwardly within said opening, transversely of said air stream and for causing said slurry to strike with force against the inside surface of said deflector whereby said entangled masses of fibers are broken apart upon impact with the deflector and the separated fibers are deflected back into said air stream so that when said housing is directed toward said predetermined surface, said fibers are carried in random dispersion in said air stream over said predetermined surface and are allowed to gravitate therefrom onto said predetermined surface in separated random orientation.

2. An apparatus for spraying a liquid-fiber slurry in which the fibers agglomerate into small masses containing liquid and wherein the fibers are entangled with each other, comprising a tubular housing having a longitudinal axis and an end providing a discharge opening concentric with said axis, a tubular deflecting member of sheet material mounted within said end of the housing in concentric relation therewith and being circumferentially spaced from said housing, means for moving a stream of air at high velocity within said housing and toward said end for emergence through said discharge opening, said air thereby passing through the space circumscribed by said deflecting member, a slurry nozzle mounted within said housing on the axis thereof and having an outlet directed toward said discharge opening of the housing, a material deflecting cone having an apex and a base edge circumscribing the axis of the cone, and means mounting said cone within said housing with said apex confronting the outlet of said nozzle, with said cone projecting outward toward said deflecting member so that an imaginary projection of said cone passes through said deflecting member, and with said base edge in radially spaced relation to said deflecting member whereby slurry discharged from said nozzle is directed by said cone in a fan-shaped sheet through the stream of air between said deflecting member and said base edge and impacted against said deflecting member so that said fiber masses are burst apart and the fibers separated therefrom and deflected back into said air stream, said deflected fibers being further torn apart by said moving air stream so as to dispense said fibers substantially uniformly throughout said stream.

References Cited in the file of this patent

UNITED STATES PATENTS

| | | |
|---|---|---|
| 1,605,491 | Williams | Nov. 2, 1926 |
| 1,882,377 | Whittelsey | Oct. 11, 1932 |
| 1,916,885 | Kirschbraun | July 4, 1933 |
| 1,962,806 | Clapp | June 12, 1934 |
| 2,062,445 | Charlton | Dec. 1, 1936 |
| 2,082,855 | Tark | June 8, 1937 |
| 2,361,144 | Loepsinger | Oct. 24, 1944 |
| 2,374,955 | Raper | May 1, 1945 |
| 2,419,365 | Nagel | Apr. 22, 1947 |
| 2,587,240 | Spreng | Feb. 26, 1952 |
| 2,596,074 | Hawes | May 6, 1952 |
| 2,674,494 | Matterson et al. | Apr. 6, 1954 |
| 2,697,008 | Rowley | Dec. 14, 1954 |
| 2,699,629 | Wandel | Jan. 18, 1955 |
| 2,768,859 | Patterson | Oct. 30, 1956 |
| 2,802,303 | Weeks | Aug. 13, 1957 |
| 2,861,786 | Madsen | Nov. 25, 1958 |
| 2,878,617 | Finn | Mar. 24, 1959 |
| 2,916,855 | Thiegs | Dec. 15, 1959 |
| 3,004,717 | Flury | Oct. 17, 1961 |

FOREIGN PATENTS

| | | |
|---|---|---|
| 560,328 | Italy | Apr. 2, 1957 |
| 1,232,915 | France | May 2, 1960 |